United States Patent
Han et al.

(10) Patent No.: US 10,140,960 B2
(45) Date of Patent: Nov. 27, 2018

(54) AUTOMATIC ADJUSTABLE DISPLAY SYSTEM AND ADJUSTING METHOD AND ADJUSTING DEVICE THEREOF

(71) Applicant: BOE TECHNOLOGY GROUP CO., LTD., Beijing (CN)

(72) Inventors: Yang Han, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 24 days.

(21) Appl. No.: 15/326,027

(22) PCT Filed: Feb. 26, 2016

(86) PCT No.: PCT/CN2016/074706
§ 371 (c)(1),
(2) Date: Jan. 12, 2017

(87) PCT Pub. No.: WO2017/049869
PCT Pub. Date: Mar. 30, 2017

(65) Prior Publication Data
US 2017/0263215 A1    Sep. 14, 2017

(30) Foreign Application Priority Data

Sep. 25, 2015 (CN) .......................... 2015 1 0623753

(51) Int. Cl.
*G09G 5/38* (2006.01)
*G06F 3/01* (2006.01)
(Continued)

(52) U.S. Cl.
CPC .............. *G09G 5/38* (2013.01); *F16M 11/18* (2013.01); *G06F 1/1637* (2013.01); *G06F 3/01* (2013.01);
(Continued)

(58) Field of Classification Search
CPC ........ G09G 5/38; G09G 2354/00; G09G 5/08; G06F 3/011; G06F 3/01; G06F 3/013;
(Continued)

(56) References Cited

U.S. PATENT DOCUMENTS

2014/0139657 A1    5/2014   Chiu et al.

FOREIGN PATENT DOCUMENTS

| CN | 102053629 A | 5/2011 |
| CN | 201876734 U | 6/2011 |

(Continued)

OTHER PUBLICATIONS

CN201876734_ENG.pdf , google machine English translation of Chinese patent Application CN102662334A, Inventor: Yang, Qinye; published Jun. 22, 2011.*

(Continued)

*Primary Examiner* — Amr Awad
*Assistant Examiner* — Wing Chow
(74) *Attorney, Agent, or Firm* — Kinney & Lange, P.A.

(57) ABSTRACT

An automatic adjustable display system and this adjusting method and device are provided to realize automatic adjustment of display system, so as to provide users with optimal viewing angle and viewing height. In the display system, an image acquiring unit is configured to acquire user images; a control unit is configured to receive and analyze the user images to determine user state information, and if the user state information meets a first preset condition, the control unit generates a first adjusting instruction for adjusting a distance between the display unit and the user and sends the first adjusting instruction to an implementing unit; the implementing unit is configured to receive the first adjusting instruction sent by the control unit and adjust the distance between the user and the display unit according to the first adjusting instruction.

19 Claims, 5 Drawing Sheets

(51) Int. Cl.
*G06K 9/00* (2006.01)
*G06K 9/03* (2006.01)
*F16M 11/18* (2006.01)
*G06F 1/16* (2006.01)
*G09G 5/08* (2006.01)

(52) U.S. Cl.
CPC .............. *G06F 3/011* (2013.01); *G06F 3/013* (2013.01); *G06K 9/00362* (2013.01); *G06K 9/00604* (2013.01); *G06K 9/03* (2013.01); *G09G 5/08* (2013.01); *G09G 2354/00* (2013.01)

(58) Field of Classification Search
CPC .... G06F 1/1637; G06K 9/03; G06K 9/00604; G06K 9/00362; F16M 11/18
See application file for complete search history.

(56) References Cited

FOREIGN PATENT DOCUMENTS

| CN | 102662334 A | 9/2012 |
|---|---|---|
| CN | 102927415 A | 2/2013 |
| CN | 103075623 A | 5/2013 |
| CN | 103412620 A | 11/2013 |
| CN | 103699138 A | 4/2014 |
| CN | 103869829 A | 6/2014 |
| CN | 103914130 A | 7/2014 |
| CN | 104898820 A | 9/2015 |
| CN | 105117023 A | 12/2015 |
| CN | 10524787 A | 1/2016 |

OTHER PUBLICATIONS

CN102662334A_ENG.pdf, google machine English translation of Chinese patent Application CN102662334U, Inventor: Zhang; published Sep. 12, 2012, made of record in the IDS submitted Jan. 12, 2017.*

International Search Report and Written Opinion (including English translation of Box V.) dated Jun. 15, 2016, for corresponding PCT Application No. PCT/CN2016/074706.

Second Chinese Office Action, for Chinese Patent Application No. 201510623753.2, dated Dec. 25, 2017, 15 pages.

First Chinese Office Action, for Chinese Patent Application No. 201510623753.2, dated Jun. 15, 2017, 14 pages.

* cited by examiner

AUTOMATIC ADJUSTABLE DISPLAY SYSTEM AND ADJUSTING METHOD AND ADJUSTING DEVICE THEREOF

CROSS-REFERENCE TO RELATED APPLICATION

This application is a Section 371 National Stage Application of International Application No. PCT/CN2016/07470 filed on 26 Feb. 2016, entitled "AUTOMATIC ADJUSTABLE DISPLAY SYSTEM AND ADJUSTING METHOD AND ADJUSTING DEVICE THEREOF", which claims priority to Chinese Patent Application Serial No. 201510623753.2 filed on 25 Sep. 2015, incorporated herein by reference in its entirety.

TECHNICAL FIELD

The present application relates to the field of display technology, and specially, to an automatic adjustable display system and adjusting method and adjusting device thereof.

BACKGROUND

With the popularization of office automation, domestic display devices such as computers and tablet computers have been more and more popular in people's lives. People use computers to learn external information and to study. Computers have become indispensable parts of people's lives.

A currently available display for computer cannot be automatically adjusted such that a user can be at optimal viewing position, thus, it is inconvenient for the user to watch the display in different directions and at different heights. The user usually needs to keep his gesture for a long time to gradually get used to the contents on the display, and it is easily to get eye tiredness, such that working efficiency is greatly reduced, working intensity is increased and body health will be significantly affected.

Although some displays for desktop computers may be adjusted manually to rotate within a certain angle range, the displays cannot be automatically adjusted such that users may watch the displays at different angles or at different heights and within an optimal watching range.

SUMMARY

An automatic adjustable display system and adjusting method and device thereof are provided to achieve automatic adjustment of the display system, so as to provide users with optimal viewing angle and viewing height.

An automatic adjustable display system is provided according to an embodiment of the present application. The display system may comprise a display unit, an image acquiring unit, a control unit and an implementing unit, where the image acquiring unit is configured to acquire a user image of a user in real time and sending the user image to the control unit; the control unit is configured to receive and analyze the user image to determine user state information, and generate a first adjusting instruction for adjusting a distance between the display unit and the user and sends the first adjusting instruction to the implementing unit if the user state information meets a first preset condition; and the implementing unit is configured to receive the first adjusting instruction sent by the control unit and adjust the distance between the user and the display unit according to the first adjusting instruction.

In the automatic adjustable display system according to the embodiment of the present application, the image acquiring unit acquires the user image in real time and sends the user image to the control unit; the control unit receives and analyzes the user image to determine user state information, and if the user state information meets the first preset condition, the control unit generates and send the first adjusting instruction to the and implementing unit, the first adjusting instruction is for adjusting the distance between the display system and the user; the implementing unit adjusts the distance between the user and the display unit according to the received first adjusting instruction, such that the user may be provided with comfortable viewing angle and height, user's feeling of tiredness may be reduced and working efficiency may be improved.

Preferably, the user state information may include a ratio between an area of a profile or a size of a key portion of the user's body in the user image and an area of the profile or a size of the key portion of the user's body in a preset standard user image; the control unit is further configured to determine the ratio between the area of the profile or the size of the key portion of the user's body in the user image and the area of the profile or the size of the key portion of the user's body in the preset standard user image through analyzing the user image, and to send the first adjusting instruction for adjusting the distance between the display unit and the user to the implementing unit if the ratio between the area of the profile or the size of the key portion of the user's body in each of a plurality of successive user images and the area of the profile or the size of the key portion of the user's body in the preset standard user image falls outside a first predetermined range; and the implementing unit is further configured to move the display unit in a direction towards the user according to the first adjusting instruction if the ratio between the area of the profile or the size of the key portion of the user's body in each of the plurality of successive user images and the area of the profile or the size of the key portion of the user's body in the preset standard user image is less than a minimum value of the first predetermined range, and to move the display unit in a direction away from the user according to the first adjusting instruction if the ratio between the area of the profile or the size of the key portion of the user's body in each of the plurality of successive user images and the area of the profile or the size of the key portion of the user's body in the preset standard user image is larger than a maximum value of the first predetermined range.

Through analyzing the user images by the control unit to determine the ratio between the area of the profile or the size of the key portion of the user's body in the user image and the area of the profile or the size of the key portion of the user's body in the preset standard user image and sending the first adjusting instruction for adjusting the distance between the display unit and the user to the implementing unit if the ratio between the area of the profile or the size of the key portion of the user's body in each of the plurality of successive user images and the area of the profile or the size of the key portion of the user's body in the preset standard user image falls outside the first predetermined range, specifically, moving the display unit in the direction towards the user according to the first adjusting instruction if the ratio between the area of the profile or the size of the key portion of the user's body in each of the plurality of successive user images and the area of the profile or the size of the key portion of the user's body in the preset standard user image is less than the minimum value of the first predetermined range and moving the display unit in the direction away from the user according to the first adjusting instruction if the ratio between the area of the profile or the size of the key portion of the user's body in each of the plurality of successive user images and the area of the profile or the size of the key portion of the user's body in the preset standard user image is larger than the maximum value of the first predetermined range, the distance between the user and the display unit may be maintained within an optimal viewing range.

Preferably, the control unit may be further configured to generate a second adjusting instruction for adjusting a height of the display unit and send the second adjusting instruction to the implementing unit, if the user state information meets a second preset condition; and the implementing unit is further configured to receive the second adjusting instruction sent by the control unit and adjust the height of the display unit according to the second adjusting instruction.

through generating the second adjusting instruction for adjusting the height of the display unit and sending the second adjusting instruction to the implementing unit if the user state information meets the second preset condition and through adjusting the height of the display unit according to the second adjusting instruction by the implementing unit, the relative height of the user's eyes with respect to the display unit may be maintained, the user may be maintained within an optimal range of viewing angle, the user may be provided with comfortable viewing angle and height, user's feeling of tiredness may be reduced and working efficiency may be improved.

Preferably, the user state information may further include a relative height of the user's eyes in the user image; the control unit is further configured to analyze the user image to determine the relative height of the user's eyes in the user image, and to send the second adjusting instruction for adjusting the height of the display unit to the implementing unit if the relative height of the user's eyes in each of a plurality of successive user images falls outside a second predetermined range; and the implementing unit is further configured to increase the height of the display unit according to the second adjusting instruction if the relative height of the user's eyes in each of the plurality of successive user images is larger than a maximum value of the second predetermined range, and to decrease the height of the display unit according to the second adjusting instruction if the relative height of the user's eyes in each of the plurality of successive user images is less than a minimum value of the second predetermined range.

Through analyzing the user image to determine the relative height of the user's eyes in the user image and sending the second adjusting instruction for adjusting the height of the display unit to the implementing unit if the relative height of the user's eyes in each of a plurality of successive user images falls outside a second predetermined range, and through increasing the height of the display unit if the relative height of the user's eyes in each of the plurality of successive user images is larger than the maximum value of the second predetermined range and decreasing the height of the display unit if the relative height of the user's eyes in each of the plurality of successive user images is less than the minimum value of the second predetermined range according to the second adjusting instruction by the implementing unit, the user may be always maintained within the optimal range of viewing angle, and the user may be provided with a proper viewing angle and a proper viewing height, such that the user's feeling of tiredness may be eased and working efficiency may be improved.

Preferably, the user state information may further include the relative height of the user's eyes in the user image, and if the ratio between the area of the profile or the size of the key portion of the user's body in each of the plurality of successive user images and the area of the profile or the size of the key portion of the user's body in the preset standard user image falls within the first predetermined range: the control unit is further configured to analyze the user images to determine relative heights of the user's eyes in the user images, and to send the second adjusting instruction for adjusting the height of the display unit to the implementing unit if each of the relative heights of the user's eyes in the successive user images falls outside the second predetermined range; and the implementing unit is further configured to increase the height of the display unit if each of the relative heights of the user's eyes in the successive user images is larger than the maximum value of the second predetermined range, and to decrease the height of the display unit if each of the relative heights of the user's eyes in the successive user images is less than the minimum value of the second predetermined range, according to the second adjusting instruction.

If the ratio between the area of the profile or the size of the key portion of the user's body in each of the plurality of successive user images and the area of the profile or the size of the key portion of the user's body in the preset standard user image falls within the first predetermined range, the control unit further adjusts the relative height of the user with respect to the display unit. Specifically, relative position of the user's eyes in the user images is determined through analyzing the user images, and if each of the relative positions of the user's eyes in the successive user images falls outside the second predetermined range, the control unit sends the second adjusting instruction for adjusting the height of the display unit to the implementing unit; the implementing unit increases the height of the display unit if each of the relative heights of the user's eyes in the successive user images is larger than the maximum value of the second predetermined range, and decreases the height of the display unit if each of the relative heights of the user's eyes in the successive user images is less than the minimum value of the second predetermined range, such that the user may be maintained within an optimal range of viewing angle, and the user may be provided with comfortable viewing angle and height, such that user's feeling of tiredness may be reduced and working efficiency may be increased.

Preferably, the user state information may further include a ratio between a width of the user's head and a width of the user's shoulder in the user image; the control unit is further configured to analyze the user images to determine the ratio between the width of the user's head and the width of the user's shoulder, and to send a third instruction for warning the user to maintain a proper seated gesture to the implementing unit, if the ratio between the width of the user's head and the width of the user's shoulder in each of a plurality of successive user images falls outside a third predetermined range; and the implementing unit is further configured to move the display unit in a direction away from the user according to the third instruction if the ratio between the width of the user's head and the width of the user's shoulder in each of the plurality of successive user images is less than a minimum value of the third predetermined range, and to move the display unit in a direction towards the user according to the third instruction if the ratio between the width of the user's head and the width of the user's shoulder in each of the plurality of successive user images is larger than a maximum value of the third predetermined range.

Through determining the ratio between the width of the user's head and the width of the user's shoulder and sending the implementing unit the third instruction for warning the user to maintain a proper seated gesture by the control unit if the ratio between the width of the user's head and the width of the user's shoulder in each of the plurality of successive user images falls outside the third predetermined range, and through moving the display unit in the direction away from the user by the implementing unit according to the third instruction if the ratio between the width of the user's head and the width of the user's shoulder in each of the plurality of successive user images is less than the minimum value of the third predetermined range, the display unit is moved farther away from the user to make the user uncomfortable to watch the display unit and force the user to change his/her improper backward seated gesture, and through moving the display unit in a direction towards the user by the implementing unit according to the third instruction if the ratio between the width of the user's head and the width of the user's shoulder in each of the plurality of successive user images is larger than the maximum value of the third predetermined range, the display unit is moved nearer to the user to make the user uncomfortable to watch the display unit and force the user to change his/her improper forward seated gesture, the distance between the user and the display unit and the height of the display unit may be adjusted on the basis of the user being in a proper seated gesture, and the user may be provided with a comfortable viewing angle.

Preferably, the control unit may include a determining module configured to determine whether or not the ratio between the width of the user's head and the width of the user's shoulder in each of the plurality of successive user images falls outside the third predetermined range; and the control unit is further configured to send only the third instruction for warning the user to maintain a proper seated gesture to the implementing unit, if the ratio between the width of the user's head and the width of the user's shoulder in each of the plurality of successive user images falls outside the third predetermined range.

Through determining whether the ratio between the width of the user's head and the width of the user's shoulder in each of the plurality of successive user images falls outside the third predetermined range by determining module, the control unit sends only the third instruction for warning the user to maintain a proper seated gesture to the implementing unit if the ratio between the width of the user's head and the width of the user's shoulder in each of the plurality of successive user images falls outside the third predetermined range. Since the user's seated gesture in the acquired plurality of successive user images is not proper, the first instruction and the second instruction generated based on the user information in the plurality of successive user images are not accurate. Therefore, if the ratio between the width of the user's head and the width of the user's shoulder in each of the plurality of successive user images falls outside the third predetermined range, the control unit sends only the third instruction to the implementing unit to warn the user to maintain a proper seated gesture, such that no wrong instruction will be sent to the implementing unit, working load and power consumption of the display system may be reduced at the same time.

Based on the same inventive concept, an automatic adjustable display device is provided according to an embodiment of the present application. The device may comprise a display structure and a base for supporting the display structure; the display device further includes a sensor, a controller and an implementing part, the controller being electrically connected with the sensor and the implementing part; the sensor is configured to acquire a user image of a user in real time and send the user image to the controller; the controller is configured to receive and analyze the user images to determine user state information, and to generate the first adjusting instruction for adjusting the distance between the display structure and the user and send the first adjusting instruction to the implementing unit if the user state information meets a first preset condition; and the implementing unit is configured to receive the first adjusting instruction sent by the controller, and to adjust the distance between the display structure and the user according to the first adjusting instruction.

In the automatic adjustable display device according to the embodiment of the present application, the sensor acquires user images in real time and sends the user images to the controller; the controller receives and analyzes the user images to determine the user state information, and if the user state information meets the first preset condition, the controller generates the first adjusting instruction for adjusting the distance between the display structure and the user and sends the first adjusting instruction to the implementing unit; the implementing unit adjusts the distance between the display structure and the user according to the received first adjusting instruction, such that the distance between the display structure and the user is maintained within the optimal viewing range, the user may be provided with comfortable viewing angle and height, the user's feeling of tiredness may be reduced and working efficiency may be increased.

Preferably, the controller may be further configured to generate a second adjusting instruction for adjusting a height of the display structure and send the second adjusting instruction to the implementing part, if the user state information meets a second preset condition; and the implementing part is further configured to receive the second adjusting instruction sent by the controller and adjust the height of the display structure according to the second adjusting instruction.

If the user state information meets the second preset condition, the controller generates the second adjusting instruction for adjusting the height of the display structure and sends the second adjusting instruction to the implementing part; the implementing part adjusts the height of the display structure according to the received second adjusting instruction, such that the distance between the display structure and the user is maintained within the optimal viewing range, the relative height between the user's eyes and the display structure is fixed, the user is always in the optimal range of viewing angle, so that the user may be provided with comfortable viewing angle and height, the user's feeling of tiredness may be reduced and working efficiency may be increased.

Preferably, the implementing unit may comprise at least four wheels underneath the base and the wheels are used to adjust the distance between the user and the display structure according to the first adjusting instruction.

Preferably, the implementing unit may further include a lifting platform configured to adjust the height of the display structure according to the second adjusting instruction.

Preferably, the implementing unit may further include a rack and pinion assembly configured to control the raising and lowering operations of the lifting platform.

Based on the same inventive, an adjusting method for the automatic adjustable display system is provided, and the method comprising steps of: acquiring a user image of a user in real time and sending the user image to the control unit by the image acquiring unit when the display unit, the image acquiring unit, the control unit and the implementing unit are in operating states; receiving and analyzing the user image by the control unit to determine user state information, generating a first adjusting instruction by the control unit for adjusting the distance between the display unit and the user, and sending the first adjusting instruction to the implementing unit by the control unit if the user state information meets a first preset condition; and receiving the first adjusting instruction sent by the control unit and adjusting the distance between the display unit and the user by the implementing unit according to the first adjusting instruction.

In the method provided in the embodiment of the present application, the image acquiring unit acquires user image in real time and sends the user image to the control unit; the control unit receives the user image and analyzes the user image to determine the user state information, and if the user state information meets the first preset condition, the control unit generates the first adjusting instruction for adjusting the distance between the display unit and the user and sends the first adjusting instruction to the implementing unit; the implementing unit adjusts the distance between the display unit and the user according to the received first adjusting instruction, such that the distance between the display unit and the user is maintained within an optimal range of viewing, the user may be provided with comfortable viewing angle and height, user's feeling of tiredness may be reduced and working efficiency may be improved.

Preferably, the user state information may include a ratio between an area of a profile or a size of a key portion of the user's body in the user image and an area of the profile or a size of the key portion of the user's body in a preset standard user image, the method further comprises: determining the ratio between the area of the profile or the size of the key portion of the user's body in the user image and the area of the profile or the size of the key portion of the user's body in the preset standard user image by the control unit through analyzing the user image, and sending the first adjusting instruction for adjusting the distance between the display unit and the user to the implementing unit by the control unit if the ratio between the area of the profile or the size of the key portion of the user's body in each of a plurality of successive user images and the area of the profile or the size of the key portion of the user's body in the preset standard user image falls outside the first predetermined range; and moving the display unit by the implementing unit in a direction towards the user according to the first adjusting instruction if the ratio between the area of the profile or the size of the key portion of the user's body in each of the plurality of successive user images and the area of the profile or the size of the key portion of the user's body in the preset standard user image is less than a minimum value of the first predetermined range, and moving the display unit by the implementing unit in a direction away from the user according to the first adjusting instruction if the ratio between the area of the profile or the size of the key portion of the user's body in each of the plurality of successive user images and the area of the profile or the size of the key portion of the user's body in the preset standard user image is larger than a maximum value of the first predetermined range.

Through analyzing the user image by the control unit, the ratio between the area of the profile or the size of the key portion of the user's body in the user image and the area of the profile or the size of the key portion of the user's body in the preset standard user image can be determined, and based on the ratio between the area of the profile or the size of the key portion of the user's body in the user image and the area of the profile or the size of the key portion of the user's body in the preset standard user image, whether the distance between the user and the display system is in an optimal range of viewing distance is determined. If the ratio between the area of the profile or the size of the key portion of the user's body in each of a plurality of successive user images and the area of the profile or the size of the key portion of the user's body in the preset standard user image falls outside the first predetermined range, the control unit may send the first adjusting instruction for adjusting the distance between the display unit and the user to the implementing unit; the implementing unit may move the display unit towards or away from the user based on the ratio between the area of the profile or the size of the key portion of the user's body in each of a plurality of successive user images and the area of the profile or the size of the key portion of the user's body in the preset standard user image and the first predetermined range according to the first adjusting instruction. Specifically, if the ratio between the area of the profile or the size of the key portion of the user's body in each of the plurality of successive user images and the area of the profile or the size of the key portion of the user's body in the preset standard user image is less than the minimum value of the first predetermined range, the implementing unit moves the display unit in a direction towards the user, and if the ratio between the area of the profile or the size of the key portion of the user's body in each of the plurality of successive user images and the area of the profile or the size of the key portion of the user's body in the preset standard user image is larger than the maximum value of the first predetermined range, the implementing unit moves the display unit in a direction away from the user, such that the distance between the user and the display unit may be maintained within the optimal range of viewing distance.

Preferably, if the user state information meets the second preset condition, the control unit generates the second adjusting instruction for adjusting the height of the display unit and sends the second adjusting instruction to the implementing unit; the implementing unit receives the second adjusting instruction sent by the control unit and adjusts the height of the display unit according to the second adjusting instruction.

By generating the second adjusting instruction for adjusting the height of the display unit and sending the second adjusting instruction to the implementing unit if the user state information meets the second preset condition and by adjusting the height of the display unit according to the second adjusting instruction via the implementing unit, the relative height of the user's eyes to the display unit may be maintained, the user may be ensured to be within an optimal range of viewing angle, such that the user may be provided with comfortable viewing angle and height, the user's feeling of tiredness may be reduced and working efficiency may be improved.

Preferably, the user state information may further include a relative height of the user's eyes in the user image, and the method may further comprise: determining the relative height of the user's eyes in the user image by the control unit through analyzing the user images and sending a second adjusting instruction for adjusting the height of the display unit to the implementing unit by the control unit, if the relative height of the user's eyes in each of a plurality of successive user images falls outside the second predetermined range; and increasing the height of the display unit by the implementing unit according to the second adjusting instruction if the relative height of the user's eyes in each of the plurality of successive user images is larger than a maximum value of the second predetermined range, and decreasing the height of the display unit by the implementing unit according to the second adjusting instruction if the relative height of the user's eyes in each of the plurality of successive user images is less than a minimum value of the second predetermined range.

Through analyzing the user image to determine the relative height of the user's eyes in the user image and sending the second adjusting instruction for adjusting the height of the display unit to the implementing unit if the relative height of the user's eyes in each of the plurality of successive user images falls outside a second predetermined range, and through increasing the height of the display unit by the implementing unit if the relative height of the user's eyes in each of the plurality of successive user images is larger than the maximum value of the second predetermined range and decreasing the height of the display unit by the implementing unit if the relative height of the user's eyes in each of the plurality of successive user images is less than the minimum value of the second predetermined range according to the second adjusting instruction, such that the user may be always maintained within the optimal range of viewing angle, the user may be provided with proper viewing angle and height, the user's feeling of tiredness may be eased and working efficiency may be improved.

Preferably, the user state information may further include a relative height of the user's eyes in the user image, and if the ratio between the area of the profile or the size of the key portion of the user's body in each of a plurality of successive user images and the area of the profile or the size of the key portion of the user's body in the preset standard user image falls within the first predetermined range, the method further comprises: determining the relative height of the user's eyes in the user image by the control unit through analyzing the user images, and sending a second adjusting instruction for adjusting the height of the display unit to the implementing unit by the control unit if the relative height of the user's eyes in each of a plurality of successive user images falls outside the second predetermined range; and increasing the height of the display unit by the implementing unit according to the second adjusting instruction if the relative height of the user's eyes in each of the plurality of successive user images is larger than a maximum value of the second predetermined range, and decreasing the height of the display unit by the implementing unit according to the second adjusting instruction if the relative height of the user's eyes in each of the plurality of successive user images is less than a minimum value of the second predetermined range.

Through analyzing the user images by the control unit, the relative height of the user's eyes in the user image can be determined, and based on the relative height of the user's eyes in the user image, it can be determined whether the user is in the optimal range of viewing height; if the relative height of the user's eyes in each of the plurality of successive user images falls outside the second predetermined range, the control unit sends the second adjusting instruction for adjusting the height of the display unit to the implementing unit; the implementing unit increases the height of the display unit if each of the relative heights of the user's eyes in the plurality of successive user images is larger than the maximum value of the second predetermined range, and decreases the height of the display unit if each of the relative heights of the user's eyes in the successive user images is less than the minimum value of the second predetermined range, such that the user may be maintained within an optimal range of viewing angle, and the user may be provided with comfortable viewing angle and height, such that user's feeling of tiredness may be reduced and working efficiency may be increased.

Preferably, the user state information may further include a ratio between a width of the user's head and a width of the user's shoulder in the user image, and the method further comprises: analyzing the user image by the control unit to determine the ratio between the width of the user's head and the width of the user's shoulder, and sending a third instruction for warning the user to maintain a proper seated gesture to the implementing unit by the control unit if the ratio between the width of the user's head and the width of the user's shoulder in each of a plurality of successive user images falls outside the a predetermined range; and moving the display unit in the direction away from the user by the implementing unit according to the third instruction if the ratio between the width of the user's head and the width of the user's shoulder in each of the plurality of successive user images is less than a minimum value of the third predetermined range, and moving the display unit in a direction towards the user by the implementing unit according to the third instruction if the ratio between the width of the user's head and the width of the user's shoulder in each of the plurality of successive user images is larger than a maximum value of the third predetermined range.

The control unit determines the ratio between the width of the user's head and the width of the user's shoulder; if the ratio between the width of the user's head and the width of the user's shoulder in each of the plurality of successive user images falls outside the third predetermined range, the third instruction being used for warning the user to maintain a proper seated gesture is sent to the implementing unit; if the ratio between the width of the user's head and the width of the user's shoulder in each of the plurality of successive user images is less than the minimum value of the third predetermined range, the display unit is moved in the direction away from the user by the implementing unit according to the third instruction, the display unit is moved farther away from the user to make the user uncomfortable to watch the display unit and force the user to change his/her excessive backward seated gesture; and if the ratio between the width of the user's head and the width of the user's shoulder in each of the plurality of successive user images is larger than the maximum value of the third predetermined range, the display unit is moved nearer to the user to make the user uncomfortable to watch the display unit and force the user to change his/her excessively forward seated gesture, such that the distance between the user and the display unit and the height of the display unit may be adjusted on the basis of the user being in a proper seated gesture, and the user may be provided with a comfortable viewing angle.

Preferably, the control unit may further include a determining module and the method may further comprise: determining by the determining module whether or not the ratio between the width of the user's head and the width of the user's shoulder in each of the plurality of successive user images falls outside the third predetermined range; and sending the third instruction for warning the user to maintain a proper seated gesture only to the implementing unit by the control unit, if the ratio between the width of the user's head and the width of the user's shoulder in each of the plurality of successive user images falls outside the third predetermined range.

Through determining whether the ratio between the width of the user's head and the width of the user's shoulder in each of the plurality of successive user images falls outside the third predetermined range by determining module, the control unit sends only the third instruction for warning the user to maintain a proper seated gesture to the implementing unit if the ratio between the width of the user's head and the width of the user's shoulder in each of the plurality of successive user images falls outside the third predetermined range. Since the user's seated gesture in the acquired plurality of successive user images is not proper, the first instruction and the second instruction generated based on the user information in the plurality of successive user images are not accurate. Therefore, if the ratio between the width of the user's head and the width of the user's shoulder in each of the plurality of successive user images falls outside the third predetermined range, the control unit sends only the third instruction to the implementing unit to warn the user to maintain a proper seated gesture, such that no wrong instruction will be sent to the implementing unit, working load and power consumption of the display system may be reduced at the same time.

DETAILED DESCRIPTION OF PREFERRED EMBODIMENTS

An automatic adjustable display system and an adjusting method thereof are disclosed according to embodiments of the present application, so as to achieve an automatic adjustment of the display system to provide a user with optimal viewing angle and height.

Technical solutions according to embodiments of the present application will be clearly and thoroughly described in conjunction with the drawings. Apparently, the described embodiments are only a part—not all—of the present application.

An automatic adjustable display system is provided according to an embodiment of the present application. The display system includes a display unit and a base for supporting the display unit, and the display system also includes an image acquiring unit, a control unit and an implementing unit. Specifically, the image acquiring unit is configured to acquire a user image of a user in real time and sending the user image to the control unit; the control unit is configured to receive and analyze the user image to determine user state information, and generate a first adjusting instruction for adjusts a distance between the display system and the user and send the first adjusting instruction to the implementing unit if the user state information meets a first preset condition; the implementing unit is configured to receive the first adjusting instruction sent by the control unit, and to adjust a distance between the user and the display unit according to the first adjusting instruction.

In the automatic adjustable display system according to the embodiment of the present application, the image acquiring unit acquires a user image in real time and sends the user image to the control unit; the control unit receives and analyzes the user image to determine user state information, and if the user state information meets a first preset condition, the control unit generates and send a first adjusting instruction to the and implementing unit, the first adjusting instruction is for adjusting a distance between the display system and the user; the implementing unit adjusts the distance between the user and the display unit according to the received first adjusting instruction, such that the user may be provided with comfortable viewing angle and height, user's feeling of tiredness may be reduced and working efficiency may be improved.

Figure 1:
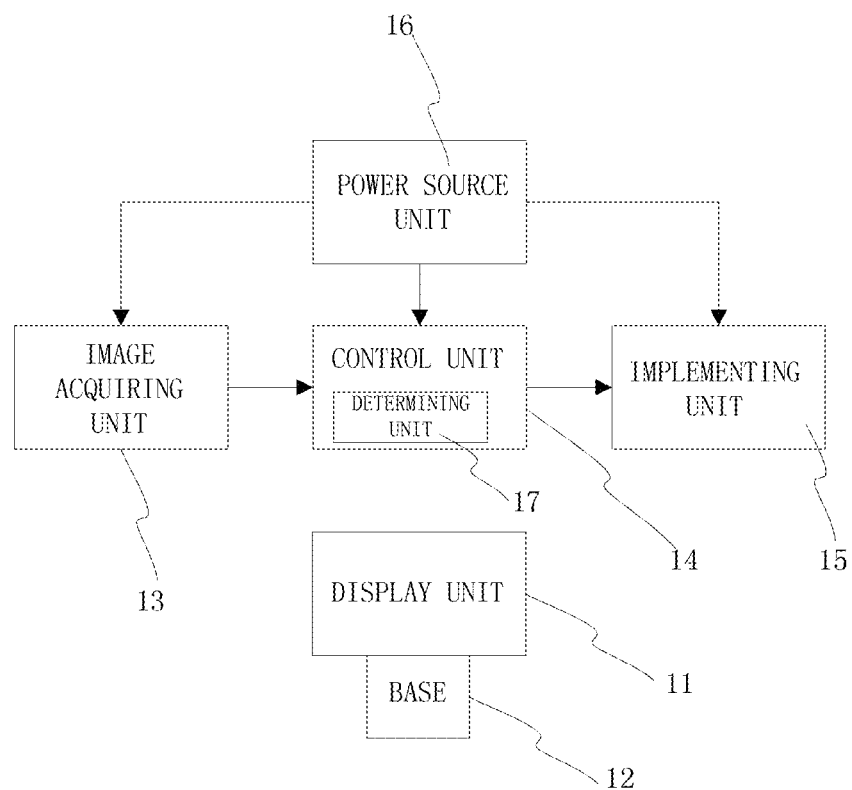
FIG. 1 is schematic drawing showing a structure of a display system according to a first embodiment of the present application.

Refer to FIG. 1, an automatic adjustable display system according to a first embodiment of the present application includes a display unit 11 for display an image and a base 12 for supporting the display unit 11; in order to realize an automatic adjusting function of the display system, the display system further includes: an image acquiring unit 13, a control unit 14 and an implementing unit 15. Specifically, the image acquiring unit 13 is configured to acquire a user image and sending the user image to the control unit; the control unit 14 is configured to receive and analyze the user image to determine user state information, and if the user state information meets a first preset condition, the control unit generates a first adjusting instruction for adjusting a distance between the display system and the user and sends the first adjusting instruction to the implementing unit; and the implementing unit 15 is configured to receive the first adjusting instruction sent by the control unit, and to adjust a distance between the user and the display unit according to the first adjusting instruction.

Further, the user state information includes a ratio between an area of a profile or a size of a key portion of the user's body in the user image and an area of a profile or a size of a key portion of a user's body in a preset standard user image.

Specifically, the control unit 14 is further configured to determine the ratio between the area of the profile or the size of the key portion of the user's body in the user image and the area of the profile or the size of the key portion of the user's body in the preset standard user image through analyzing the user image, and to send the first adjusting instruction for adjusting the distance between the display unit and the user to the implementing unit if the ratio between the area of the profile or the size of the key portion of the user's body in each of a plurality of successive user images and the area of the profile or the size of the key portion of the user's body in the preset standard user image falls outside a first predetermined range.

The implementing unit 15 is further configured to move the display unit in a direction towards the user according to the first adjusting instruction if the ratio between the area of the profile or the size of the key portion of the user's body in each of the plurality of successive user images and the area of the profile or the size of the key portion of the user's body in the preset standard user image is less than a minimum value of the first predetermined range, and to move the display unit in a direction away from the user according to the first adjusting instruction if the ratio between the area of the profile or the size of the key portion of the user's body in each of the plurality of successive user images and the area of the profile or the size of the key portion of the user's body in the preset standard user image is larger than a maximum value of the first predetermined range.

For example, a user image acquired in a condition of the user being 60 cm away from the display system, eyes of the user being at the same height as a position of a first line of words displayed on the display unit, the user being at the center of the image and the user being in a proper seated gesture is preset as the preset standard user image. Based on the ratio between the area of the profile or the size of the key portion of the user's body in the user image and the area of the profile or the size of the key portion of the user's body in the preset standard user image, it can be determined whether the distance between the user and the display system is in an optimal range of viewing distance.

Specifically, through moving the display unit in the direction towards the user if the ratio between the area of the profile or the size of the key portion of the user's body in each of the plurality of successive user images and the area of the profile or the size of the key portion of the user's body in the preset standard user image is less than the minimum value of the first predetermined range and moving the display unit in the direction away from the user if the ratio between the area of the profile or the size of the key portion of the user's body in each of the plurality of user images and the area of the profile or the size of the key portion of the user's body in the preset standard user image is larger than the maximum value of the first predetermined range, the distance between the user and the display unit is maintained within the optimal range of viewing distance. For example, a ratio between a user image acquired in a condition of the user being 50 cm away from the display system, eyes of the user being at the same height as the position of the first line of words displayed on the display unit, the user being at the center of the image and the user being in a proper seated gesture and the preset standard user image may be set as the maximum value of the first predetermined range, and a ratio between a user image acquired in a condition of the user being 70 cm away from the display system, eyes of the user being at the same height as the position of the first line of words displayed on the display unit, the user being at the center of the image and the user being in a proper seated gesture and the preset standard user image may be set as the minimum value of the first predetermined range. If the ratio between the area of the profile or the size of the key portion of the user's body in each of the plurality of successive user images and the area of the profile or the size of the key portion of the user's body in the preset standard user image falls with the first predetermined range, the distance between the user and the display unit does not need to be changed. If the ratio between the area of the profile or the size of the key portion of the user's body in each of the plurality of successive user images and the area of the profile or the size of the key portion of the user's body in the preset standard user image is less than the minimum valve of the first predetermined range, it is determined that the distance between the user and the display unit is larger than 70 cm and the display unit needs to be moved in the direction towards the user. If the ratio between the area of the profile or the size of the key portion of the user's body in each of the plurality of successive user images and the area of the profile or the size of the key portion of the user's body in the preset standard user image is large than the maximum valve of the first predetermined range, it is determined that the distance between the user and the display unit is less than 50 cm and the display unit needs to be moved in the direction away from the user.

Further, the control unit 14 is further configured to generate a second adjusting instruction for adjusting a height of the display unit and send the second adjusting instruction to the implementing unit, if the user state information meets a second preset condition; the implementing unit 15 is also configured to receive the second adjusting instruction sent by the control unit and adjust the height of the display unit according to the second adjusting instruction.

By generating the second adjusting instruction for adjusting the height of the display unit and sending the second adjusting instruction to the implementing unit if the user state information meets the second preset condition and by adjusting the height of the display unit according to the second adjusting instruction via the implementing unit 15, a relative height of the user's eyes to the display unit may be maintained, the user may be ensured to be within an optimal range of viewing angle, the user may be provided with comfortable viewing angle and height, user's feeling of tiredness may be reduced and working efficiency may be improved.

The user state information may further include a relative height of the user's eyes in the user image; the control unit 14 is further configured to analyze the user image to determine the relative height of the user's eyes in the user image, and to send the second adjusting instruction for adjusting the height of the display unit to the implementing unit if the relative height of the user's eyes in each of a plurality of successive user images falls outside a second predetermined range; the implementing unit 15 is further configured to increase the height of the display unit according to the second adjusting instruction if the relative height of the user's eyes in each of the plurality of successive user images is larger than a maximum value of the second predetermined range, and to decrease the height of the display unit according to the second adjusting instruction if the relative height of the user's eyes in each of the plurality of successive user images is less than a minimum value of the second predetermined range.

Through analyzing the user image to determine the relative height of the user's eyes in the user image and sending the second adjusting instruction for adjusting the height of the display unit to the implementing unit if the relative height of the user's eyes in each of a plurality of successive user images falls outside a second predetermined range, and through increasing the height of the display unit if the relative height of the user's eyes in each of the plurality of successive user images is larger than the maximum value of the second predetermined range and decreasing the height of the display unit if the relative height of the user's eyes in each of the plurality of successive user images is less than the minimum value of the second predetermined range according to the second adjusting instruction via the implementing unit, the user may be always maintained within the optimal range of viewing angle, and the user may be provided with a proper viewing angle and a proper viewing height, such that the user's feeling of tiredness may be eased and working efficiency may be improved.

For example, in the standard user image, the user' eyes are at the same height as the first line of words displayed on the display unit, and this height is set as a standard height. Assuming that the user's eyes has a standard relative height $h_0$ in the user image, a minimum valve of the second predetermined range is set to a relative height $h_1$ where the user's eye is 5 cm lower than the first line of words displayed on the display unit, a maximum valve of the second predetermined range is set to a relative height $h_2$ where the user's eye is 5 cm higher than the first line of words displayed on the display unit, and $h_1<h_0<h_2$. If a relative height of the user's eyes in each of a plurality of successive user images is less than the minimum valve $h_1$, then a height of the display unit needs to be decreased; If the relative height of the user's eyes in each of the plurality of successive user images is larger than the maximum valve $h_1$, then the height of the display unit needs to be increased.

In an embodiment, the distance adjustment may be performed first, then the height adjustment is performed; or the height adjustment may be performed first, then the distance adjustment is performed. Considering that the extent of distance adjustment is usually larger than that of the height adjustment, the distance adjustment may be performed before the height adjustment so as to improve efficiency of these adjustments.

Specifically, the user state information further includes the relative height of the user's eyes in the user image. If the ratio between the area of the profile or the size of the key portion of the user's body in each of the plurality of successive user images and the area of the profile or the size of the key portion of the user's body in the preset standard user image falls within the first predetermined range: the control unit further analyzes the user images to determine relative heights of the user's eyes in the user images and sends the second adjusting instruction for adjusting the height of the display unit to the implementing unit if each of the relative heights of the user's eyes in the successive user images falls outside the second predetermined range; the implementing unit increases the height of the display unit if each of the relative heights of the user's eyes in the successive user images is larger than the maximum value of the second predetermined range, and decreases the height of the display unit if each of the relative heights of the user's eyes in the successive user images is less than the minimum value of the second predetermined range.

If the ratio between the area of the profile or the size of the key portion of the user's body in each of the plurality of successive user images and the area of the profile or the size of the key portion of the user's body in the preset standard user image falls within the first predetermined range, the control unit further adjusts the relative height of the user with respect to the display unit. Specifically, relative positions of the user's eyes in the successive user images are determined through analyzing the user images, if each of the relative positions of the user's eyes in the successive user images falls outside the second predetermined range, the control unit sends the second adjusting instruction for adjusting the height of the display unit to the implementing unit; the implementing unit increases the height of the display unit if each of the relative heights of the user's eyes in the successive user images is larger than the maximum value of the second predetermined range, and decreases the height of the display unit if each of the relative heights of the user's eyes in the successive user images is less than the minimum value of the second predetermined range, such that the user may be maintained within an optimal range of viewing angle, and the user may be provided with comfortable viewing angle and height, such that user's feeling of tiredness may be reduced and working efficiency may be increased.

Further, the user state information may also include a ratio between a width of the user's head and a width of the user's shoulder in the user image; the control unit 14 is also configured to analyze the user images to determine the ratio between the width of the user's head and the width of the user's shoulder, and to send a third instruction for warning the user to maintain a proper seated gesture to the implementing unit, if the ratio between the width of the user's head and the width of the user's shoulder in each of a plurality of successive user images falls outside a third predetermined range; the implementing unit 15 is also configured to move the display unit in a direction away from the user according to the third instruction if the ratio between the width of the user's head and the width of the user's shoulder in each of the plurality of successive user images is less than a minimum value of the third predetermined range, and to move the display unit in a direction towards the user according to the third instruction if the ratio between the width of the user's head and the width of the user's shoulder in each of the plurality of successive user images is larger than a maximum value of the third predetermined range.

Through determining the ratio between the width of the user's head and the width of the user's shoulder and sending the implementing unit the third instruction for warning the user to maintain a proper seated gesture by the control unit if the ratio between the width of the user's head and the width of the user's shoulder in each of the plurality of successive user images falls outside the third predetermined range, and through moving the display unit in the direction away from the user by the implementing unit according to the third instruction if the ratio between the width of the user's head and the width of the user's shoulder in each of the plurality of successive user images is less than the minimum value of the third predetermined range, the display unit is moved farther away from the user to make the user uncomfortable to watch the display unit and force the user to change his/her improper backward seated gesture; and through moving the display unit in a direction towards the user by the implementing unit according to the third instruction if the ratio between the width of the user's head and the width of the user's shoulder in each of the plurality of successive user images is larger than the maximum value of the third predetermined range, the display unit is moved nearer to the user to make the user uncomfortable to watch the display unit and force the user to change his/her improper forward seated gesture, such that the distance between the user and the display unit and the height of the display unit may be adjusted on the basis of the user being in a proper seated gesture, and the user may be provided with a comfortable viewing angle.

For example, in order to correct the user's gesture, the display unit may be moved forward or backward for 5 cm each time to make the user uncomfortable to watch if the ratio between the width of the user's head and the width of the user's shoulder in each of the plurality of successive user images falls outside the third predetermined range, until the circumstance of the ratio between the width of the user's head and the width of the user's shoulder in each of the plurality of successive user images being outside the third predetermined ranged has eliminated. Besides, the distance of moving the display unit forward or backward each time may be determined by the user based on his/her own need.

Further, the control unit 14 may include a determining module 17 configured to determine whether or not the ratio between the width of the user's head and the width of the user's shoulder in each of the plurality of successive user images falls outside the third predetermined range. The control unit is further configured to send only the third instruction for warning the user to maintain a proper seated gesture to the implementing unit, if the ratio between the width of the user's head and the width of the user's shoulder in each of the plurality of successive user images falls outside the third predetermined range.

In other words, through determining whether the ratio between the width of the user's head and the width of the user's shoulder in each of the plurality of successive user images falls outside the third predetermined range by determining module 17, the control unit sends only the third instruction for warning the user to maintain a proper seated gesture to the implementing unit if the ratio between the width of the user's head and the width of the user's shoulder in each of the plurality of successive user images falls outside the third predetermined range. Since the user's seated gesture in the acquired plurality of successive user images is not proper, the first instruction and the second instruction generated based on the user information in the plurality of successive user images are not accurate. Therefore, if the ratio between the width of the user's head and the width of the user's shoulder in each of the plurality of successive user images falls outside the third predetermined range, the control unit sends only the third instruction to the implementing unit to warn the user to maintain a proper seated gesture, such that no wrong instruction will be sent to the implementing unit, working load and power consumption of the display system may be reduced at the same time.

Further, the display system may also include a power source unit 16 for powering each of the above described components.

Figure 2:
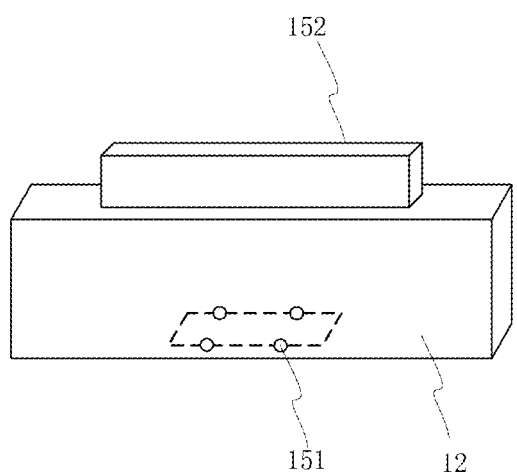
FIG. 2 is schematic drawing showing a structure of a base according to the first embodiment of the present application.

Specifically, the image acquiring unit 13, the control unit 14 and the implementing unit 15 of the display system may be disposed inside the base, as shown in FIG. 2. And specifically, the image acquiring unit 13 may include a camera, and a sidewall of the base 12 facing the user may be provided with a hole such that a lens of the camera may acquire user images in real time via the hole.

The implementing unit 15 may include at least four wheels 151 located at the bottom of the base 12 and a lifting platform 152 located at the top of the base; the lifting platform 152 cooperates with the based in a clearance fit, and under an external force, the lifting platform 152 may be raised or lowered at a certain speed, such that the relative height of the display unit such as a display panel or a display with respect to the user changes. In an embodiment of the present application, the height adjustment function of the display system is achieved by using a rack and pinion assembly; the rack and the pinion engaged with each other have the same linear speed, and through controlling a rotation speed of the pinion, a moving speed of the rack can be controlled, and a speed of height adjustment can be controlled.

After detecting the relative height of the user's eyes in the user image, a comparison between the relative height of the user's eyes and the position of the user's eyes in the standard image is conducted to determine an amount of change of the relative height; methods of calculating the amount of change of the relative height may include: determining a ratio of a difference between the actual relative height and the standard relative height to the image; multiplying the ratio by a length covered by the image (which may be determined in an actual photographing test), such that a differential height to be adjusted can be determined. The height adjustment is achieved by the rack and the pinion engaged with each other having the same linear speed. Through controlling the rotation speed of the pinion, the moving speed of the rack can be controlled, the speed of height adjustment can be controlled, and a final adjusted height is determined by a motor that drives the pinion.

In a second embodiment of the present application, there is provided an automatic adjustable display system, which is not provided with the control unit. Instead, an existing control part of the display unit may be used to receive the user image, analyze the user image to determine the user state information, generate and send the first adjusting instruction for adjusting the distance between the display system and the user to the implementing unit if the user state information meets the first preset condition, and/or generate and send the second adjusting instruction for adjusting the height of the display unit to the implementing unit if the user state information meets the second preset condition. Through sharing the same control unit with the display unit, production cost of the display system may be further lowered.

Figure 3:
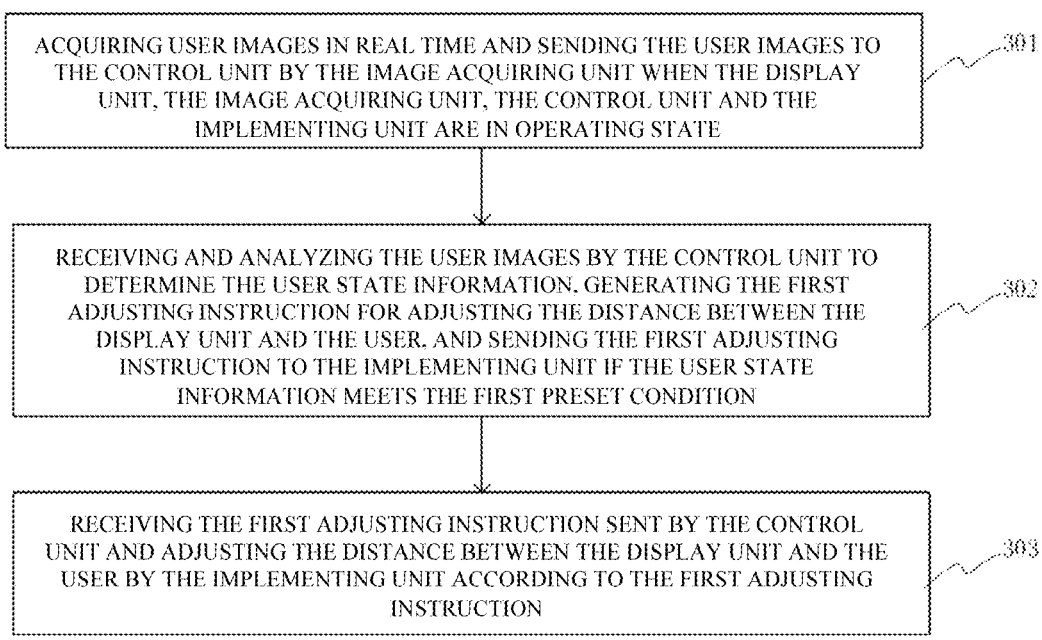
FIG. 3 is a schematic flow chart showing an adjusting method for a display system according to a third embodiment of the present application.

Based on the same inventive concept, an adjusting method for the automatic adjustable display system described above is provided in a third embodiment of the present application. Referring to FIG. 3, the method includes:

Step 301: acquiring user images in real time and sending the user images to the control unit by the image acquiring unit when the display unit, the image acquiring unit, the control unit and the implementing unit are in operating state;

Step 302: receiving and analyzing the user images by the control unit to determine the user state information, generating the first adjusting instruction for adjusting the distance between the display unit and the user, and sending the first adjusting instruction to the implementing unit if the user state information meets the first preset condition;

Step 303, receiving the first adjusting instruction sent by the control unit and adjusting the distance between the display unit and the user by the implementing unit according to the first adjusting instruction.

In the method provided in the embodiment of the present application, the image acquiring unit acquires user image in real time and sends the user image to the control unit; the control unit receives the user image and analyzes the user image to determine the user state information, and if the user state information meets the first preset condition, the control unit generates the first adjusting instruction for adjusting the distance between the display unit and the user and sends the first adjusting instruction to the implementing unit; the implementing unit adjusts the distance between the display unit and the user according to the received first adjusting instruction, such that the distance between the display unit and the user is maintained within an optimal range of viewing, the user may be provided with comfortable viewing angle and height, user's feeling of tiredness may be reduced and working efficiency may be improved.

Further, the user state information includes the ratio between the area of the profile or the size of the key portion of the user's body in the user image and the area of the profile or the size of the key portion of the user's body in the preset standard user image.

The ratio between the area of the profile or the size of the key portion of the user's body in the user image and the area of the profile or the size of the key portion of the user's body in the preset standard user image may be determined by the control unit through analyzing the user image, and the control unit sends the first adjusting instruction for adjusting the distance between the display unit and the user to the implementing unit if the ratio between the area of the profile or the size of the key portion of the user's body in each of a plurality of successive user images and the area of the profile or the size of the key portion of the user's body in the preset standard user image falls outside the first predetermined range.

The display unit is moved by the implementing unit in a direction towards the user according to the first adjusting instruction if the ratio between the area of the profile or the size of the key portion of the user's body in each of the plurality of successive user images and the area of the profile or the size of the key portion of the user's body in the preset standard user image is less than the minimum value of the first predetermined range; and the display unit is moved by the implementing unit in a direction away from the user according to the first adjusting instruction if the ratio between the area of the profile or the size of the key portion of the user's body in each of the plurality of successive user images and the area of the profile or the size of the key portion of the user's body in the preset standard user image is larger than the maximum value of the first predetermined range.

Through analyzing the user image by the control unit, the ratio between the area of the profile or the size of the key portion of the user's body in the user image and the area of the profile or the size of the key portion of the user's body in the preset standard user image can be determined, and based on the ratio between the area of the profile or the size of the key portion of the user's body in the user image and the area of the profile or the size of the key portion of the user's body in the preset standard user image, it can be determined whether the distance between the user and the display system is in an optimal range of viewing distance. If the ratio between the area of the profile or the size of the key portion of the user's body in each of a plurality of successive user images and the area of the profile or the size of the key portion of the user's body in the preset standard user image falls outside the first predetermined range, the control unit may send the first adjusting instruction for adjusting the distance between the display unit and the user to the implementing unit; the implementing unit may move the display unit towards or away from the user based on the ratio between the area of the profile or the size of the key portion of the user's body in each of a plurality of successive user images and the area of the profile or the size of the key portion of the user's body in the preset standard user image and the first predetermined range according to the first adjusting instruction. Specifically, if the ratio between the area of the profile or the size of the key portion of the user's body in each of the plurality of successive user images and the area of the profile or the size of the key portion of the user's body in the preset standard user image is less than the minimum value of the first predetermined range, the implementing unit moves the display unit in a direction towards the user, and if the ratio between the area of the profile or the size of the key portion of the user's body in each of the plurality of successive user images and the area of the profile or the size of the key portion of the user's body in the preset standard user image is larger than the maximum value of the first predetermined range, the implementing unit moves the display unit in a direction away from the user, such that the distance between the user and the display unit may be maintained within the optimal range of viewing distance.

Further, if the user state information meets the second preset condition, the control unit 14 generates the second adjusting instruction for adjusting the height of the display unit and sends the second adjusting instruction to the implementing unit 15; the implementing unit 15 receives the second adjusting instruction sent by the control unit and adjusts the height of the display unit according to the second adjusting instruction.

By generating the second adjusting instruction for adjusting the height of the display unit and sending the second adjusting instruction to the implementing unit if the user state information meets the second preset condition and by adjusting the height of the display unit according to the second adjusting instruction via the implementing unit, the relative height of the user's eyes to the display unit may be maintained, the user may be ensured to be within an optimal range of viewing angle, such that the user may be provided with comfortable viewing angle and height, the user's feeling of tiredness may be reduced and working efficiency may be improved.

Further, the user state information further includes the relative height of the user's eyes in the user image; the control unit 14 determines the relative height of the user's eyes in the user image through analyzing the user image and sends the second adjusting instruction for adjusting the height of the display unit to the implementing unit 15 if the relative height of the user's eyes in each of a plurality of successive user images falls outside the second predetermined range; the implementing unit 15 increases the height of the display unit according to the second adjusting instruction if the relative height of the user's eyes in each of the plurality of successive user images is larger than the maximum value of the second predetermined range, and decreases the height of the display unit according to the second adjusting instruction if the relative height of the user's eyes in each of the plurality of successive user images is less than the minimum value of the second predetermined range.

Through analyzing the user image to determine the relative height of the user's eyes in the user image and sending the second adjusting instruction for adjusting the height of the display unit to the implementing unit if the relative height of the user's eyes in each of the plurality of successive user images falls outside a second predetermined range, and through increasing the height of the display unit by the implementing unit if the relative height of the user's eyes in each of the plurality of successive user images is larger than the maximum value of the second predetermined range and decreasing the height of the display unit by the implementing unit if the relative height of the user's eyes in each of the plurality of successive user images is less than the minimum value of the second predetermined range according to the second adjusting instruction, such that the user may be always maintained within the optimal range of viewing angle, the user may be provided with proper viewing angle and height, the user's feeling of tiredness may be eased and working efficiency may be improved.

In an embodiment, the distance adjustment may be performed first, then the height adjustment is performed; or the height adjustment may be performed first, then the distance adjustment is performed. Considering that the extent of distance adjustment is usually larger than that of the height adjustment, the distance adjustment may be performed before the height adjustment so as to improve efficiency of these adjustments.

Specifically, if the ratio between the area of the profile or the size of the key portion of the user's body in each of a plurality of successive user images and the area of the profile or the size of the key portion of the user's body in the preset standard user image falls within the first predetermined range, the method further includes:

analyzing the user images by the control unit 14 to determine relative heights of the user's eyes in the user images, and sending the second adjusting instruction for adjusting the height of the display unit to the implementing unit 15 if each of the relative heights of the user's eyes in the successive user images falls outside the second predetermined range;

increasing the height of the display unit by the implementing unit 15 according to the second adjusting instruction if each of the relative heights of the user's eyes in the successive user images is larger than the maximum value of the second predetermined range; and decreasing the height of the display unit by the implementing unit according to the second adjusting instruction if each of the relative heights of the user's eyes in the successive user images is less than the minimum value of the second predetermined range.

Through analyzing the user images by the control unit, the relative height of the user's eyes in the user image can be determined, and based on the relative height of the user's eyes in the user image, it can be determined whether the user is in the optimal range of viewing height; if the relative height of the user's eyes in each of the plurality of successive user images falls outside the second predetermined range, the control unit sends the second adjusting instruction for adjusting the height of the display unit to the implementing unit; the implementing unit increases the height of the display unit if each of the relative heights of the user's eyes in the plurality of successive user images is larger than the maximum value of the second predetermined range, and decreases the height of the display unit if each of the relative heights of the user's eyes in the successive user images is less than the minimum value of the second predetermined range, such that the user may be maintained within an optimal range of viewing angle, and the user may be provided with comfortable viewing angle and height, such that user's feeling of tiredness may be reduced and working efficiency may be increased.

Further, the user state information also includes the ratio between the width of the user's head and the width of the user's shoulder; the method further includes:

analyzing the user image by the control unit 14 to determine the ratio between the width of the user's head and the width of the user's shoulder, and sending the third instruction for warning the user to maintain a proper seated gesture to the implementing unit 15 if the ratio between the width of the user's head and the width of the user's shoulder in each of a plurality of successive user images falls outside the third predetermined range; and moving the display unit in the direction away from the user by the implementing unit 15 according to the third instruction if the ratio between the width of the user's head and the width of the user's shoulder in each of the plurality of successive user images is less than the minimum value of the third predetermined range, and moving the display unit in a direction towards the user by the implementing unit 15 according to the third instruction if the ratio between the width of the user's head and the width of the user's shoulder in each of the plurality of successive user images is larger than the maximum value of the third predetermined range.

Through analyzing the user images, the ratio between the width of the user's head and the width of the user's shoulder can be determined, then it can be determined whether the user is in an improper seated gesture which is excessively forward or excessively backward based on the ratio between the width of the user's head and the width of the user's shoulder. If the ratio between the width of the user's head and the width of the user's shoulder in each of the plurality of successive user images falls outside the third predetermined range, the third instruction being used for warning the user to maintain a proper seated gesture is sent to the implementing unit; if the ratio between the width of the user's head and the width of the user's shoulder in each of the plurality of successive user images is less than the minimum value of the third predetermined range, the display unit is moved in the direction away from the user by the implementing unit according to the third instruction, the display unit is moved farther away from the user to make the user uncomfortable to watch the display unit and force the user to change his/her excessive backward seated gesture; and if the ratio between the width of the user's head and the width of the user's shoulder in each of the plurality of successive user images is larger than the maximum value of the third predetermined range, the display unit is moved nearer to the user to make the user uncomfortable to watch the display unit and force the user to change his/her excessively forward seated gesture, such that the distance between the user and the display unit and the height of the display unit may be adjusted on the basis of the user being in a proper seated gesture, and the user may be provided with a comfortable viewing angle.

Figure 4:
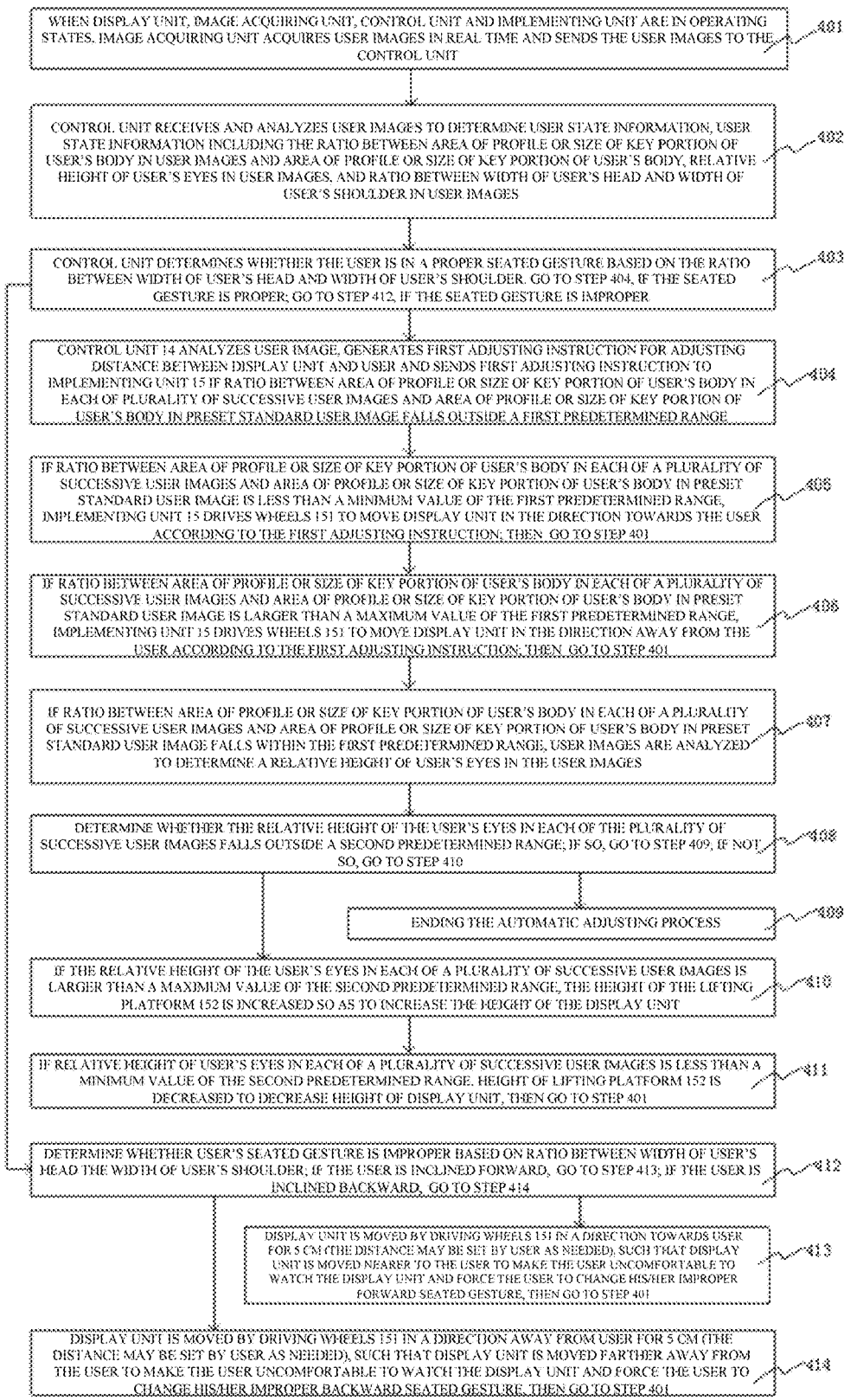
FIG. 4 is a schematic flow chart showing another adjusting method for a display system according to a fourth embodiment of the present application.
Figure 5:
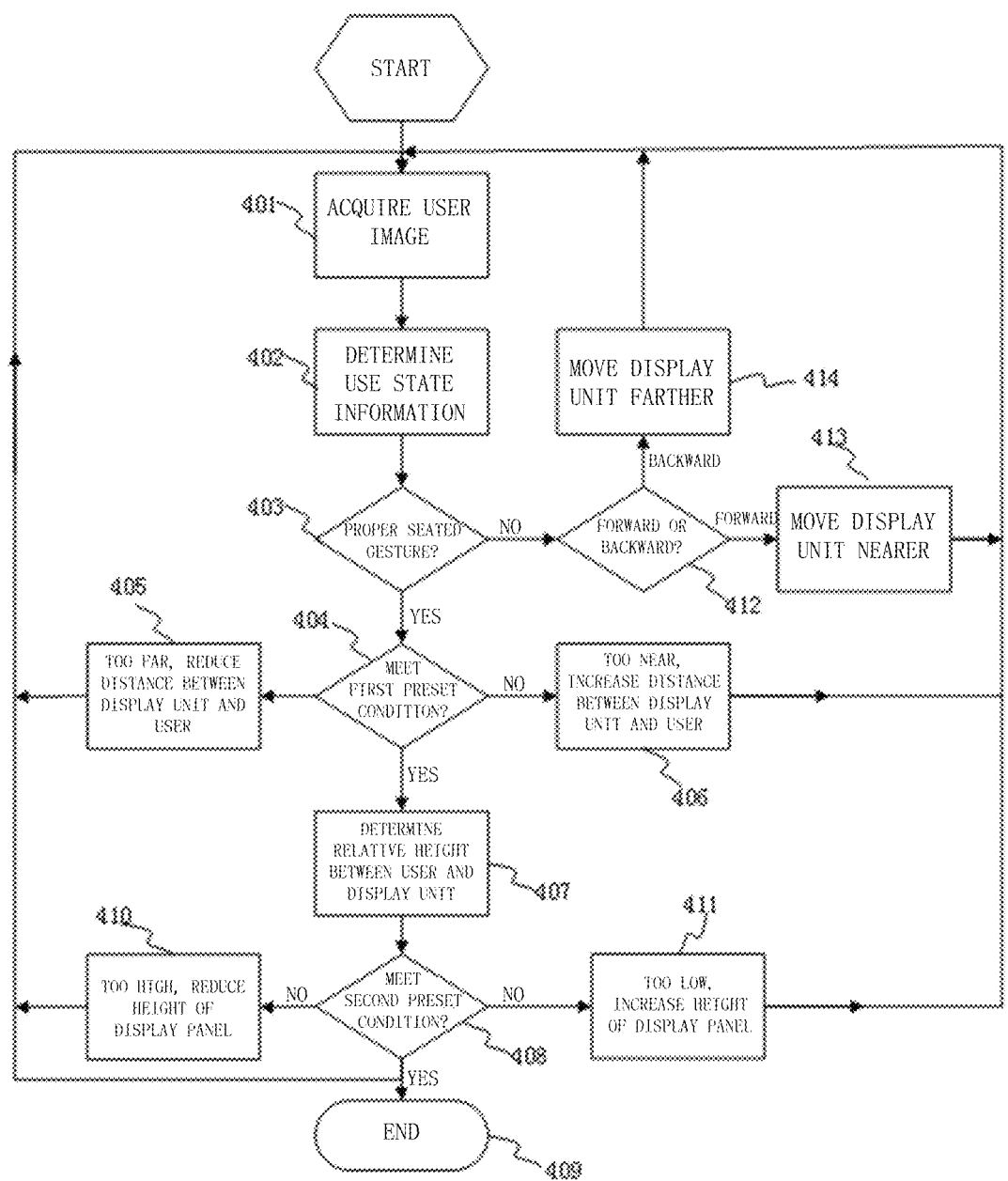
FIG. 5 is a schematic drawing showing the steps of the adjusting method according to the fourth embodiment of the present application.

The adjusting method for the automatic adjustable display system will be described hereinafter in conjunction with the automatic adjustable display system according to the fourth embodiment of the present application, as shown in FIGS. 4 and 5.

In step 401, the image acquiring unit acquires user images in real time and sends the user images to the control unit;

In Step 402, the control unit receives and analyzes the user images to determine the user state information, the user state information including the ratio between the area of the profile or the size of the key portion of the user's body in the user images and the area of the profile or the size of the key portion of the user's body, the relative height of the user's eyes in the user images, and the ratio between the width of the user's head and the width of the user's shoulder in the user images.

In Step 403, the control unit determines whether the user is in a proper seated gesture based on the ratio between the width of the user's head and the width of the user's shoulder. If the seated gesture is proper, the method goes to Step 404; and if the seated gesture is improper, the process goes to Step 412.

In Step 404, the control unit 14 analyzes the user image, and if the ratio between the area of the profile or the size of the key portion of the user's body in each of a plurality of successive user images and the area of the profile or the size of the key portion of the user's body in the preset standard user image falls outside the first predetermined range, the control unit generates the first adjusting instruction for adjusting the distance between the display unit and the user and sends the first adjusting instruction to the implementing unit 15.

In Step 405, if the ratio between the area of the profile or the size of the key portion of the user's body in each of the plurality of successive user images and the area of the profile or the size of the key portion of the user's body in the preset standard user image is less than the minimum value of the first predetermined range, the implementing unit 15 drives wheels 151 to move the display unit in the direction towards the user according to the first adjusting instruction; then the process goes to Step 401.

In Step 406, if the ratio between the area of the profile or the size of the key portion of the user's body in each of the plurality of successive user images and the area of the profile or the size of the key portion of the user's body in the preset standard user image is larger than the maximum value of the first predetermined range, the implementing unit 15 drives wheels 151 to move the display unit in the direction away from the user according to the first adjusting instruction; then the process goes to Step 401.

In Step 407, if the ratio between the area of the profile or the size of the key portion of the user's body in each of the plurality of successive user images and the area of the profile or the size of the key portion of the user's body in the preset standard user image falls within the first predetermined range, the user images are analyzed to determine the relative height of the user's eyes in the user images.

In Step 408, determine whether the relative height of the user's eyes in each of the plurality of successive user images falls outside a second predetermined range; if so, the process goes to Step 409; if not so, the process goes to Step 410.

In Step 409, the automatic adjusting process is ended.

In Step 410, if the relative height of the user's eyes in each of the plurality of successive user images is larger than the maximum value of the second predetermined range, the height of the lifting platform 152 is increased so as to increase the height of the display unit.

In Step 411, if the relative height of the user's eyes in each of the plurality of successive user images is less than the minimum value of the second predetermined range, the height of the lifting platform 152 is decreased so as to decrease the height of the display unit, and then the process goes to Step 401.

In Step 412, it is determined whether the user's seated gesture is improper based on the ratio between the width of the user's head and the width of the user's shoulder; if the user is inclined forward, the process goes to Step 413; and if the user is inclined backward, the process goes to Step 414.

Specifically, the method of determining the user's seated gesture may include: if the ratio between the width of the user's head and the width of the user's shoulder in each of the plurality of successive user images is less than the minimum value of the third predetermined range, it is determined that the user is inclined backward; and if the ratio between the width of the user's head and the width of the user's shoulder in each of the plurality of successive user images is larger than the maximum value of the third predetermined range, it is determined that the user is inclined forward.

In Step 413, the display unit is moved by the driving wheel 151 in the direction towards the user for 5 cm (the distance may be set by the user as needed), such that the display unit is moved nearer to the user to make the user uncomfortable to watch the display unit and force the user to change his/her improper forward seated gesture, then the process goes to Step 401.

In Step 414, the display unit is moved by the driving wheel 151 in the direction away from the user for 5 cm (the distance may be set by the user as needed), such that the display unit is moved farther away from the user to make the user uncomfortable to watch the display unit and force the user to change his/her improper backward seated gesture, then the process goes to Step 401.

In the method according to the embodiment of the present application, user images are acquired by the image acquiring unit in real time and sent to the control unit; the control unit receives and analyzes the user images to determine the user state information, and if the user state information meets the first preset condition, the control unit generates the first adjusting instruction for adjusting the distance between the display unit and the user and sends the first adjusting instruction to the implementing unit, and if the user state information meets the second preset condition, the control unit generates the second adjusting instruction for adjusting the height of the display unit and sends the second adjusting instruction to the implementing unit; the implementing unit adjusts the distance between the display unit and the user according to the received first adjusting instruction to ensure that the user is in an optimal range of viewing distance, and adjusts the height of the display unit according to the second adjusting instruction to fix the relative height between the user's eyes and the display unit and ensure that the user is in an optimal range of viewing angle, such that the user may be provided with comfortable viewing angle and height, and the user's feeling of tiredness may be reduced and working efficiency may be increased.

Figure 6:
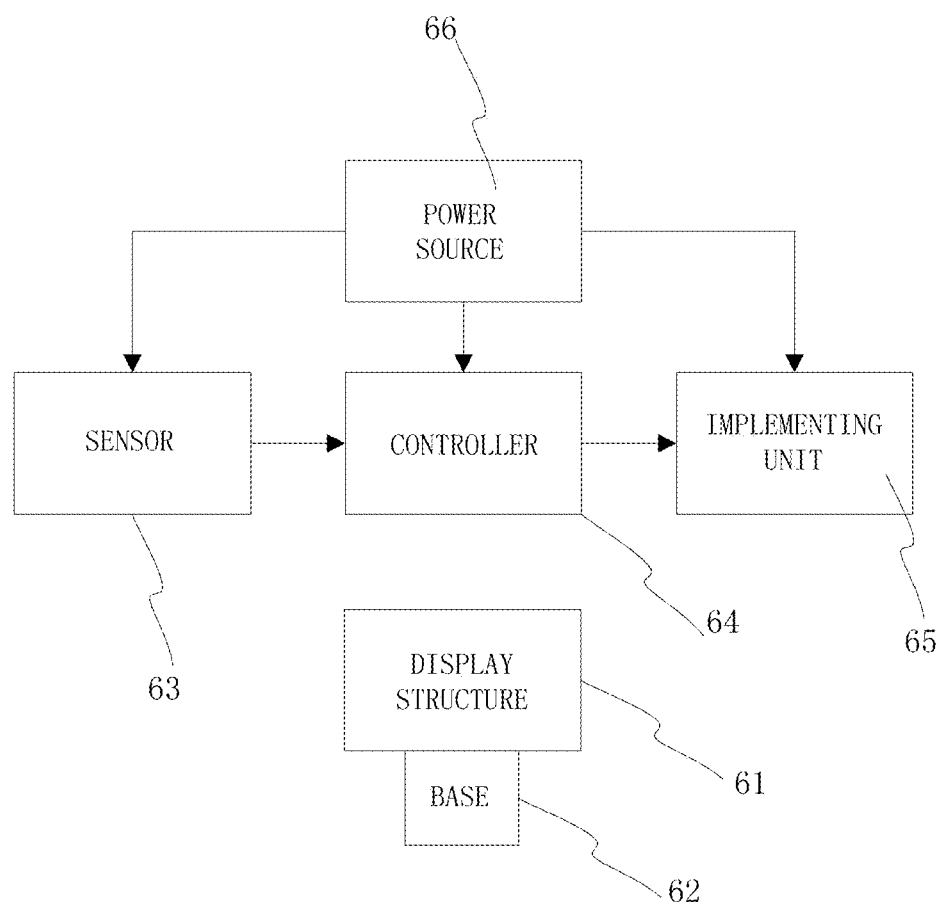
FIG. 6 is a schematic drawing showing a structure of a display device according to a fifth embodiment of the present application.

Based on the same inventive concept, as shown in FIG. 6, an automatic adjustable display device is provided according to a fifth embodiment of the present application. The display device includes: a display structure 61 which, in an example, may be a display panel, a display and the like; and a base 62 for supporting the display structure. The display device also includes a sensor 63, a controller 64 and an implementing part 65, the controller 64 being electrically connected with the sensor 63 and the implementing part 65 respectively.

The sensor 63 is configured to acquire the user images in real time and send the user images to the controller 64; specifically, the sensor 63 may include a camera, whose lens may acquire user images in real time through a hole formed in a sidewall of the base 62 facing the user.

The controller 64 is configured to receive and analyze the user images to determine the user state information, and generate the first adjusting instruction for adjusting the distance between the display structure and the user and send the first adjusting instruction to the implementing unit 65 if the user state information meets the first preset condition.

The implementing unit 65 is configured to receive the first adjusting instruction sent by the controller 64, and to adjust the distance between the display structure and the user according to the first adjusting instruction.

In the automatic adjustable display device according to the fifth embodiment of the present application, the sensor acquires user images in real time and sends the user images to the controller; the controller receives and analyzes the user images to determine the user state information, and if the user state information meets the first preset condition, the controller generates the first adjusting instruction for adjusting the distance between the display structure and the user and sends the first adjusting instruction to the implementing unit; the implementing unit adjusts the distance between the display structure and the user according to the received first adjusting instruction, such that the distance between the display structure and the user is maintained within the optimal viewing range, the user may be provided with comfortable viewing angle and height, the user's feeling of tiredness may be reduced and working efficiency may be increased.

Further, the controller 64 is further configured to generate the second adjusting instruction for adjusting the height of the display structure and send the second adjusting instruction to the implementing part 65, if the user state information meets the second preset condition; and the implementing part is further configured to receive the second adjusting instruction sent by the controller 64 and adjust the height of the display structure according to the second adjusting instruction.

If the user state information meets the second preset condition, the controller generates the second adjusting instruction for adjusting the height of the display structure and sends the second adjusting instruction to the implementing part; the implementing part adjusts the height of the display structure according to the received second adjusting instruction, such that the distance between the display structure and the user is maintained within the optimal viewing range, the relative height between the user's eyes and the display structure is fixed, the user is always in the optimal range of viewing angle, so that the user may be provided with comfortable viewing angle and height, the user's feeling of tiredness may be reduced and working efficiency may be increased.

Further, as shown in FIG. 2, the implementing unit 65 includes at least four wheels 151 underneath the base, the wheels 151 are used to adjust the distance between the user and the display structure according to the first adjusting instruction.

Still further, the implementing unit 65 includes the lifting platform 152, which is used to adjust the height of the display structure according to the second adjusting instruction.

Figure 7:
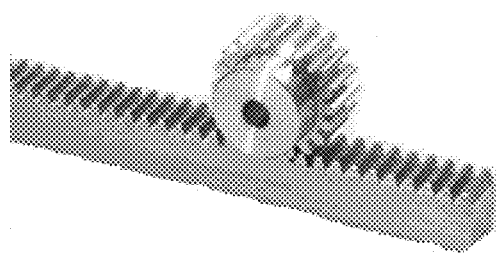
FIG. 7 is a schematic drawing showing a structure of a rack-and-pinion combination according to an implementation of the present application.

Still further, the implementing unit 65 also includes a rack and pinion assembly for controlling the raising and lowering operations of the lifting platform, as shown in FIG. 7. The lifting platform 152 cooperates with the based in a clearance fit, and under an external force, the lifting platform 152 may be raised or lowered at a certain speed, such that the relative height of the display structure with respect to the user changes. In an embodiment of the present application, the height adjustment function of the display system is achieved by the rack and pinion assembly; the rack and the pinion engaged with each other have the same linear speed, and through controlling rotation speed of the pinion, moving speed of the rack can be controlled, and the speed of height adjustment can be controlled.

Still further, the display device also includes a power source 66 for powering parts of the display device.

In the automatic adjustable display device according to the fifth embodiment of the present application, the sensor acquires user images in real time and sends the user images to the controller; the controller receives and analyzes the user images to determine the user state information, and if the user state information meets the first preset condition, the controller generates the first adjusting instruction for adjusting the distance between the display structure and the user and sends the first adjusting instruction to the implementing unit; the implementing unit receives adjusts the distance between the display structure and the user according to the received first adjusting instruction, such that the distance between the display structure and the user is maintained within the optimal viewing range, the user may be provided with comfortable viewing angle and height, the user's feeling of tiredness may be reduced and working efficiency may be increased.

In summary, an automatic adjustable display system and adjusting method thereof and a display device are provided according to embodiments of the present application. The display system is provided with the image acquiring unit, the control unit and the implementing unit. The image acquiring unit acquires user images in real time and sends to the control unit; the control unit receives and analyzes the user images to determine the user state information, and if the user state information meets the first preset condition, the control unit generates the first adjusting instruction for adjusting the distance between the display unit and the user and sends the first adjusting instruction to the implementing unit, and if the user state information meets the second preset condition, the control unit generates the second adjusting instruction for adjusting the height of the display unit and sends the second adjusting instruction to the implementing unit; the implementing unit adjusts the distance between the display unit and the user according to the received first adjusting instruction to ensure that the user is in an optimal range of viewing distance, and adjusts the height of the display unit according to the second adjusting instruction to fix the relative height between the user's eyes and the display unit and ensure that the user is in an optimal range of viewing angle, such that the user may be provided with comfortable viewing angle and height, and the user's feeling of tiredness may be reduced and working efficiency may be increased.

Obviously, changes and modifications may be made to embodiments of the present application by those skilled in the art without departing from the spirit and scope of this disclosure. Therefore, the scope of this disclosure intends to cover all the changes and modifications that fall within the scope of the appended claims and their equivalents.

What is claimed is:

1. An automatic adjustable display system, comprising a display unit, an image acquiring unit, a control unit and an implementing unit, wherein:
   the image acquiring unit is configured to acquire a user image of a user in real time and to send the user image to the control unit;
   the control unit comprises:
      memory;
      one or more processors; and
      one or more modules stored in the memory and configured for execution by the one or more processors, the one or more modules comprising instructions that are executable to receive and analyze the user image to determine user state information, and to generate a first adjusting instruction for adjusting a distance between the display unit and the user and send the first adjusting instruction to the implementing unit when the user state information meets a first preset condition; and
   the implementing unit is configured to receive the first adjusting instruction sent by the control unit and adjust the distance between the user and the display unit according to the first adjusting instruction,
   wherein the user state information includes a ratio between a width of the user's head and a width of the user's shoulder in the user image,
   wherein the one or more modules comprise instructions that are executable to analyze the user images to determine the ratio between the width of the user's head and the width of the user's shoulder, and to send a warning instruction for warning the user to maintain a proper seated gesture to the implementing unit, when the ratio between the width of the user's head and the width of the user's shoulder in each of the plurality of successive user images falls outside a third predetermined range.

2. The display system according to claim 1, wherein the user state information includes a ratio between an area of a profile or a size of a key portion of the user's body in the user image and an area of the profile or a size of the key portion of the user's body in a preset standard user image;

wherein the one or more modules comprise instructions that are executable to determine the ratio between the area of the profile or the size of the key portion of the user's body in the user image and the area of the profile or the size of the key portion of the user's body in the preset standard user image through analyzing the user image, and to send the first adjusting instruction for adjusting the distance between the display unit and the user to the implementing unit when the ratio between the area of the profile or the size of the key portion of the user's body in each of a plurality of successive user images and the area of the profile or the size of the key portion of the user's body in the preset standard user image falls outside a first predetermined range; and wherein the implementing unit is further configured to move the display unit in a direction towards the user according to the first adjusting instruction when the ratio between the area of the profile or the size of the key portion of the user's body in each of the plurality of successive user images and the area of the profile or the size of the key portion of the user's body in the preset standard user image is less than a minimum value of the first predetermined range, and to move the display unit in a direction away from the user according to the first adjusting instruction when the ratio between the area of the profile or the size of the key portion of the user's body in each of the plurality of successive user images and the area of the profile or the size of the key portion of the user's body in the preset standard user image is larger than a maximum value of the first predetermined range.

3. The display system according to claim 2, wherein the user state information further includes the relative height of the user's eyes in the user image, and when the ratio between the area of the profile or the size of the key portion of the user's body in each of the plurality of successive user images and the area of the profile or the size of the key portion of the user's body in the preset standard user image falls within the first predetermined range, the one or more modules comprise instructions that are executable to analyze the user images to determine relative heights of the user's eyes in the user images, and to send a second adjusting instruction for adjusting the height of the display unit to the implementing unit when each of the relative heights of the user's eyes in the successive user images falls outside a second predetermined range; and the implementing unit is further configured to increase the height of the display unit when each of the relative heights of the user's eyes in the successive user images is larger than the maximum value of the second predetermined range, and to decrease the height of the display unit when each of the relative heights of the user's eyes in the successive user images is less than the minimum value of the second predetermined range, according to the second adjusting instruction.

4. The display system according to claim 1, wherein the one or more modules comprise instructions that are executable to generate a second adjusting instruction for adjusting a height of the display unit and send the second adjusting instruction to the implementing unit, when the user state information meets a second preset condition; and the implementing unit is further configured to receive the second adjusting instruction sent by the control unit and adjust the height of the display unit according to the second adjusting instruction.

5. The display system according to claim 4, wherein the user state information further includes a relative height of the user's eyes in the user image;

the one or more modules comprise instructions that are executable to analyze the user image to determine the relative height of the user's eyes in the user image, and to send the second adjusting instruction for adjusting the height of the display unit to the implementing unit when the relative height of the user's eyes in each of a plurality of successive user images falls outside a second predetermined range; and the implementing unit is further configured to increase the height of the display unit according to the second adjusting instruction when the relative height of the user's eyes in each of the plurality of successive user images is larger than a maximum value of the second predetermined range, and to decrease the height of the display unit according to the second adjusting instruction when the relative height of the user's eyes in each of the plurality of successive user images is less than a minimum value of the second predetermined range.

6. The display system according to claim 1, wherein the implementing unit is further configured to move the display unit in a direction away from the user according to the warning instruction when the ratio between the width of the user's head and the width of the user's shoulder in each of the plurality of successive user images is less than a minimum value of the third predetermined range, and to move the display unit in a direction towards the user according to the warning instruction when the ratio between the width of the user's head and the width of the user's shoulder in each of the plurality of successive user images is larger than a maximum value of the third predetermined range.

7. The display system according to claim 6, wherein the one or more modules of the control unit comprises a determining module, the determining module comprising instructions that are executable to determine whether or not the ratio between the width of the user's head and the width of the user's shoulder in each of the plurality of successive user images falls outside the third predetermined range; and the one or more modules comprise instructions that are executable to send only the warning instruction for warning the user to maintain a proper seated gesture to the implementing unit, when the ratio between the width of the user's head and the width of the user's shoulder in each of the plurality of successive user images falls outside the third predetermined range.

8. An automatic adjustable display device, comprising a display structure and a base for supporting the display structure, wherein:

the display device further includes a sensor, a controller and an implementing unit, the controller being electrically connected with the sensor and the implementing unit;

the sensor is configured to acquire a user image of a user in real time and send the user image to the controller;

the controller is configured to receive and analyze the user image to determine user state information, and to generate the first adjusting instruction for adjusting a distance between the display structure and the user and send the first adjusting instruction to the implementing unit when the user state information meets a first preset condition; and the implementing unit is configured to receive the first adjusting instruction sent by the controller, and to adjust the distance between the display structure and the user according to the first adjusting instruction, wherein the user state information includes a ratio between a width of the user's head and a width of the user's shoulder in the user image, and wherein the controller is further configured to analyze the user images to determine the ratio between the width of the user's head and the width of the user's shoulder, and to send a warning instruction for warning the user to maintain a proper seated gesture to the implementing unit, when the ratio between the width of the user's head and the width of the user's shoulder in each of the plurality of successive user images falls outside a third predetermined range.

9. The display device according to claim 8, wherein the controller is further configured to generate a second adjusting instruction for adjusting a height of the display structure and send the second adjusting instruction to the implementing unit, when the user state information meets a second preset condition; and the implementing unit is further configured to receive the second adjusting instruction sent by the controller and adjust the height of the display structure according to the second adjusting instruction.

10. The display device according to claim 9, wherein the implementing unit further includes a lifting platform configured to adjust the height of the display structure according to the second adjusting instruction.

11. The display device according to claim 10, wherein the implementing unit further includes a rack and pinion assembly configured to control raising and lowering operations of the lifting platform.

12. The display device according to claim 8, wherein the implementing unit comprises at least four wheels underneath the base and the wheels are used to adjust the distance between the user and the display structure according to the first adjusting instruction.

13. An adjusting method for an automatic adjustable display system, the display system comprising a display unit, an image acquiring unit, a control unit and an implementing unit, the method comprising steps of:

acquiring a user image of a user in real time and sending the user image to the control unit by the image acquiring unit when the display unit, the image acquiring unit, the control unit and the implementing unit are in operating states;

receiving and analyzing the user image by the control unit to determine user state information, generating a first adjusting instruction by the control unit for adjusting a distance between the display unit and the user, and sending the first adjusting instruction to the implementing unit by the control unit when the user state information meets a first preset condition; and receiving the first adjusting instruction sent by the control unit and adjusting the distance between the display unit and the user by the implementing unit according to the first adjusting instruction, wherein the user state information further includes a ratio between a width of the user's head and a width of the user's shoulder in the user image, and the method further comprises: analyzing the user image by the control unit to determine the ratio between the width of the user's head and the width of the user's shoulder, and sending a warning instruction for warning the user to maintain a proper seated gesture to the implementing unit by the control unit when the ratio between the width of the user's head and the width of the user's shoulder in each of the a plurality of successive user images falls outside a third predetermined range.

14. The method according to claim 13, wherein the user state information includes a ratio between an area of a profile or a size of a key portion of the user's body in the user image and an area of the profile or a size of the key portion of the user's body in a preset standard user image, the method further comprises:

determining the ratio between the area of the profile or the size of the key portion of the user's body in the user image and the area of the profile or the size of the key portion of the user's body in the preset standard user image by the control unit through analyzing the user image, and sending the first adjusting instruction for adjusting the distance between the display unit and the user to the implementing unit by the control unit when the ratio between the area of the profile or the size of the key portion of the user's body in each of a plurality of successive user images and the area of the profile or the size of the key portion of the user's body in the preset standard user image falls outside the first predetermined range; and moving the display unit by the implementing unit in a direction towards the user according to the first adjusting instruction when the ratio between the area of the profile or the size of the key portion of the user's body in each of the plurality of successive user images and the area of the profile or the size of the key portion of the user's body in the preset standard user image is less than a minimum value of the first predetermined range, and moving the display unit by the implementing unit in a direction away from the user according to the first adjusting instruction when the ratio between the area of the profile or the size of the key portion of the user's body in each of the plurality of successive user images and the area of the profile or the size of the key portion of the user's body in the preset standard user image is larger than a maximum value of the first predetermined range.

15. The method according to claim 14, wherein the user state information further includes a relative height of the user's eyes in the user image, and when the ratio between the area of the profile or the size of the key portion of the user's body in each of a plurality of successive user images and the area of the profile or the size of the key portion of the user's body in the preset standard user image falls within the first predetermined range, the method further comprises:

determining the relative height of the user's eyes in the user image by the control unit through analyzing the user image, and sending a second adjusting instruction for adjusting the height of the display unit to the implementing unit by the control unit when the relative height of the user's eyes in each of a plurality of successive user images falls outside a second predetermined range; and increasing the height of the display unit by the implementing unit according to the second adjusting instruction when the relative height of the user's eyes in each of the plurality of successive user images is larger than a maximum value of the second predetermined range, and decreasing the height of the display unit by the implementing unit according to the second adjusting instruction when the relative height of the user's eyes in each of the plurality of successive user images is less than a minimum value of the second predetermined range.

16. The method according to claim 13, further comprising:
    generating a second adjusting instruction for adjusting a height of the display unit and sending the second adjusting instruction to the implementing unit by the control unit, when the user state information meets a second preset condition; and
    receiving the second adjusting instruction sent by the control unit and adjusting the height of the display unit by the implementing unit according to the second adjusting instruction.

17. The method according to claim 13, wherein the user state information further includes a relative height of the user's eyes in the user image and the method further comprises:
    determining the relative height of the user's eyes in the user image by the control unit through analyzing the user images and sending a second adjusting instruction for adjusting the height of the display unit to the implementing unit by the control unit, when the relative height of the user's eyes in each of a plurality of successive user images falls outside a second predetermined range; and
    increasing the height of the display unit by the implementing unit according to the second adjusting instruction when the relative height of the user's eyes in each of the plurality of successive user images is larger than a maximum value of the second predetermined range, and decreasing the height of the display unit by the implementing unit according to the second adjusting instruction when the relative height of the user's eyes in each of the plurality of successive user images is less than a minimum value of the second predetermined range.

18. The method according to claim 13, wherein the method further comprises:
    moving the display unit in the direction away from the user by the implementing unit according to the warning instruction when the ratio between the width of the user's head and the width of the user's shoulder in each of the plurality of successive user images is less than a minimum value of the third predetermined range, and moving the display unit in a direction towards the user by the implementing unit according to the warning instruction when the ratio between the width of the user's head and the width of the user's shoulder in each of the plurality of successive user images is larger than a maximum value of the third predetermined range.

19. The method according to claim 18, wherein the control unit further includes a determining module and the method further comprises:
    determining by the determining module whether or not the ratio between the width of the user's head and the width of the user's shoulder in each of the plurality of successive user images falls outside the third predetermined range; and
    sending only the warning instruction for warning the user to maintain a proper seated gesture to the implementing unit by the control unit, when the ratio between the width of the user's head and the width of the user's shoulder in each of the plurality of successive user images falls outside the third predetermined range.

* * * * *